United States Patent
Layne

(10) Patent No.: US 6,598,062 B1
(45) Date of Patent: Jul. 22, 2003

(54) RAM BASED PROCESSING ENGINE FOR SIMULTANEOUS SUM OF PRODUCTS COMPUTATION

(75) Inventor: Derek Layne, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 438 days.

(21) Appl. No.: 09/584,073

(22) Filed: May 31, 2000

(51) Int. Cl.[7] .............................................. G06F 7/38
(52) U.S. Cl. ....................................................... 708/603
(58) Field of Search ................................ 708/603, 523, 708/501, 319

(56) References Cited

U.S. PATENT DOCUMENTS

| | | | | |
|---|---|---|---|---|
| 4,573,136 A | * | 2/1986 | Rossiter | 708/603 |
| 5,410,500 A | * | 4/1995 | Ohki | 708/603 |
| 5,732,251 A | * | 3/1998 | Bartkowiak | 712/221 |
| 5,944,775 A | * | 8/1999 | Satoshi | 708/603 |

* cited by examiner

Primary Examiner—David H. Malzahn
(74) Attorney, Agent, or Firm—John A. Miller, Esq.; Warn, Burgess & Hoffmann, P.C.

(57) ABSTRACT

A processing engine (10) that generates sum of products (SOP) values for incoming data. The processing engine (10) includes a calculation module (30) for generating intermediate and SOP values based on the incoming data and coefficient values, wherein the intermediate values are defined by product values and partial presum values. A feedback module (50) stores the intermediate values until the calculation module (30) generates SOP values. The processing engine (10) further includes a reordering module (70) for reordering the SOP values. The feedback module (50) includes a switching mechanism (52) for retrieving intermediate values from the calculation module (30) until the calculation module (30) generates SOP values. Thus, a feedback RAM (53) can store the intermediate values without the need for buffering RAM at the input stage. The feedback module (50) further includes a holding register (54) for retrieving the intermediate values from the feedback RAM (53), wherein the holding register (54) routes the intermediate values to the calculation module (30).

20 Claims, 4 Drawing Sheets

RAM BASED PROCESSING ENGINE FOR SIMULTANEOUS SUM OF PRODUCTS COMPUTATION

BACKGROUND OF THE INVENTION

1. Field of the Invention

This invention relates generally to generating sum of products values and, more particularly, to a sum of products processing engine that employs random access memory for feedback purposes.

2. Discussion of the Related Art

In many digital signal processing applications, it is necessary to perform sum of products (SOP) computations. For example, in satellite communications systems it is common to use Discrete Fourier Transform (DFT) calculations to convert frequency modulated sampled waveforms into a format suitable for processing on a digital computer. Before a DFT can be performed on such incoming data, however, the data must be filtered in various different ways. Filter tap length (DFT size) refers to the number of clock cycles required to process one DFT, whereas the decimation factor refers to the number of clock cycles available to process one DFT. SOP circuits are particularly useful where the filter tap length is greater than the decimation factor resulting in a requirement for overlapping windows. The necessary data preparation techniques are done by a process commonly known as "window presumming." Typical window presum algorithms involve the multiplication of the incoming data by known coefficient values and summing the product. The result is an SOP and is extremely common in the digital signal processing industry.

Many DSP techniques have evolved in an attempt to efficiently perform SOP calculations. A common problem with most architectures, however, is dealing with the difference in incoming data rates and available processing speeds. For example, most sampled waveforms are received at a rate much faster than a serial SOP processing engine can handle. Thus, a typical SOP processor will employ random access memory (RAM) intensive architectures to buffer the data for processing and multiple processing arms to create a parallel processing scheme. Such use of RAM, however, substantially increases overall memory size, increases processing latency, and reduces design scalability.

In one specific example, the SOP processor will include a ping-pong RAM at the input stage of the processor. Ping-pong RAMs employ an additional RAM as a buffer and the data is essentially "bounced" between the RAM's to create intended delays. The delayed data is then switched between a number of processing arms placed in parallel with one another. While this approach partially addresses processing speed issues, the aforementioned shortcomings remain. Thus, it is desirable to perform SOP calculations with minimal delay and memory use.

SUMMARY OF THE INVENTION

In accordance with the teachings of the present invention, a processing engine for generating SOP values for incoming data is disclosed. In one embodiment, the processing engine includes a calculation module for generating intermediate and SOP values based on the incoming data and coefficient values, where the intermediate values are defined by product values and partial presum values. A feedback module stores the intermediate values until the calculation module generates SOP values. The processing engine further includes a reordering module for reordering the SOP values.

The feedback module includes a switching mechanism for retrieving intermediate values from the calculation module until the calculation module generates SOP values. Thus, a feedback RAM can store the intermediate values without the need for buffering RAM at the input stage. The feedback module further includes a holding register for retrieving the intermediate values from the feedback RAM, where the holding register routes the intermediate values to the calculation module.

A computerized method for generating SOP values is also provided. The method includes the step of storing product values in a feedback RAM as intermediate values until a predetermined number of product values is stored. Partial presum values are then stored in the feedback RAM as intermediate values until the calculation module generates SOP values, where the partial presum values are generated from the product values. The method further provides for reordering of the SOP values.

Additional objects, features and advantages of the invention will become apparent from the following description and the appended claims when taken in connection with the accompanying drawings.

DETAILED DESCRIPTION OF THE PREFERRED EMBODIMENTS

The following discussion of the preferred embodiments directed to using a RAM based feedback module for calculating SOP values is merely exemplary in nature, and is in no way intended to limit the invention or its applications or uses.

Figure 1:
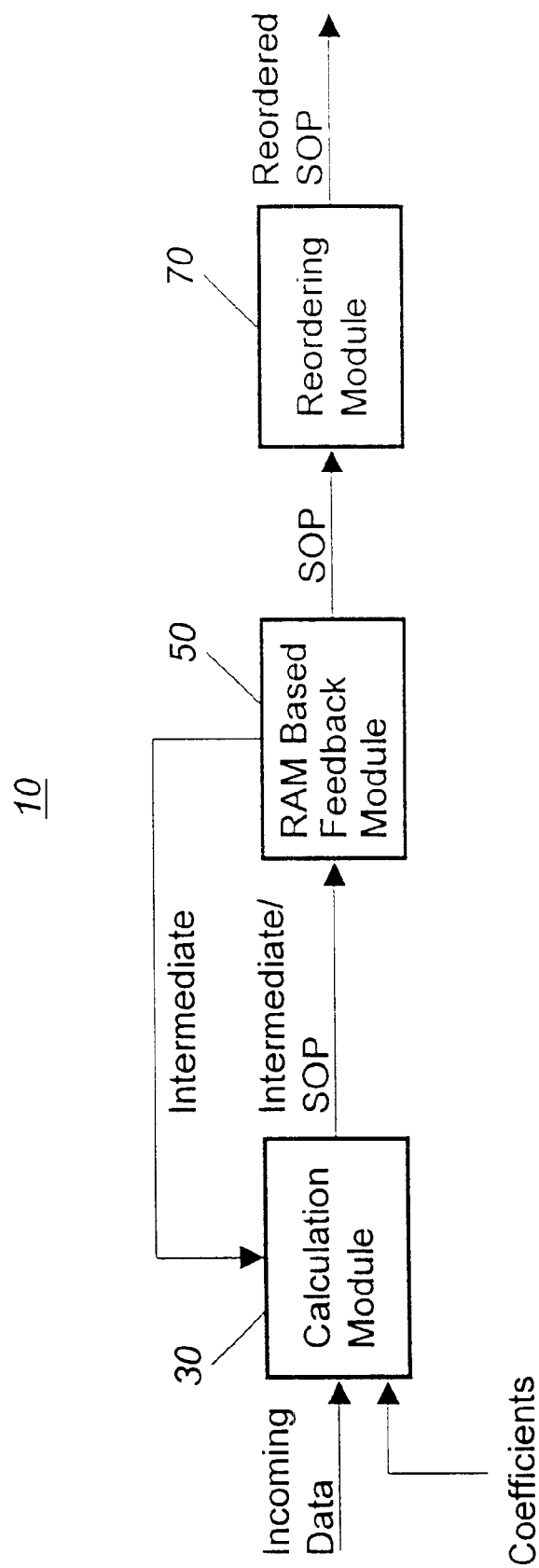
FIG. 1 is a block diagram of a processing engine for generating SOP values according to the present invention.

Turning now to FIG. 1, a processing engine for generating SOP values for incoming data is shown generally at 10. The processing engine 10 has a calculation module 30, a feedback module 50, and a reordering module 70. It will be appreciated that preferably the calculation module 30 includes a plurality of calculation sub-modules 31 (FIG. 2), wherein each calculation sub-module 31 operates on data corresponding to a processing arm of the processing engine. Similarly, the feedback module 50 includes a plurality of feedback sub-modules 51 (FIG. 2), wherein each feedback sub-module 51 operates on data corresponding to a processing arm of the processing engine 10. In a typical window presuming application, each processing arm ($W_0$–$W_n$) computes a set of L SOPs each consisting of D summations. Each SOP is of the form:

$$W_r(l) = \sum_{n=0}^{D-1} h(k)d(k),$$

where k=(I+nL) and I denotes the presum number from 0 to L.

As generally shown in FIG. 1, the calculation module 30 generates intermediate and SOP values based on the incoming data and coefficient values, where the intermediate values are defined by product values and partial presum values. The feedback module 50 stores the intermediate values and provides the intermediate values to the calculation module 30 until the calculation module 30 generates SOP values. When the calculation module 30 begins to generate the SOP values, the reordering module 70 reorders the SOP values. Thus, it can be appreciated that storing the product values and partial presum values as intermediate values until the calculation module 30 begins to generate SOP values allows the elimination of excess memory at the input stages of the design. In other words, the calculation module 30 need not perform any RAM intensive delaying of the incoming data because the feedback module 50 is able to accumulate product values and partial presum values without imposing processing delays.

Figure 2:
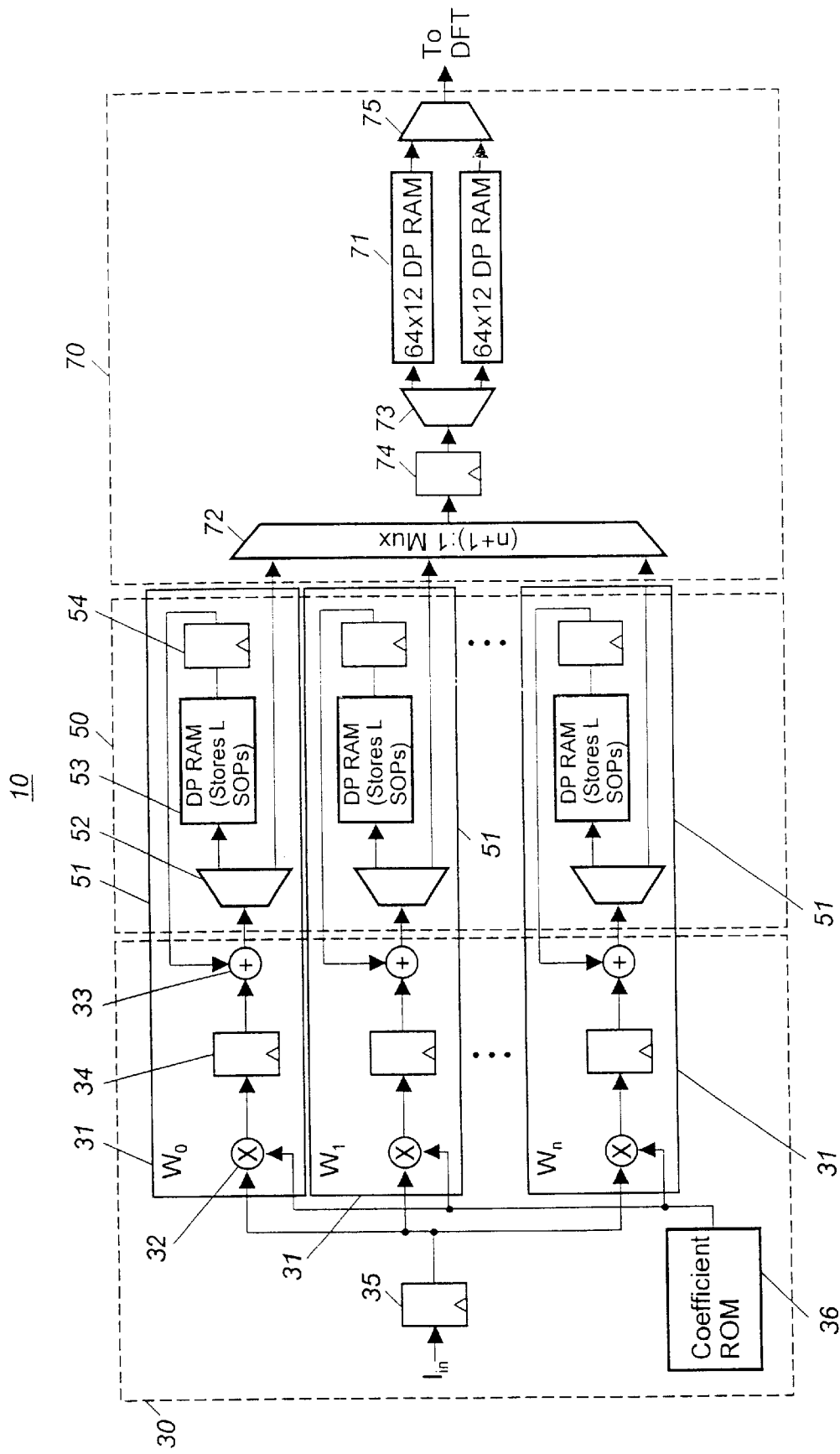
FIG. 2 is circuit schematic implementing the processing engine of FIG. 1 for multiple processing arms.

Turning to FIG. 2, the benefits of the present invention can be better understood. It can be seen that the calculation module 30 has a multiplier 32 for multiplying the incoming data by the desired coefficient values, and an adder 33 for adding the product values to the intermediate values stored by the feedback module 50. A calculation register 34 routes the product values from the multiplier 32 to the adder 33. It will be appreciated that instead of a complex ping-pong RAM, an input register 35 can be provided at the input for retrieving the incoming data and routing in; the data among the plurality of calculation submodules 31. Preferably, a coefficient read only memory (ROM) 36 contains the coefficient values used in the multiplication function.

The feedback module 50 includes a switching mechanism shown as demultiplexer 52, a feedback RAM 53, and a holding register 54. The demultiplexer 52 retrieves the intermediate values from the calculation module 30 for storage until the calculation module 30 generates SOP values. It can be seen that the demultiplexer 52 routes the SOP values to the reordering module 70 when the SOP values are present. The feedback RAM 53 stores the intermediate values for later use by the adder 33 of the calculation module 30. The holding register 54 retrieves the intermediate values from the feedback RAM 53, and routes the intermediate values to the calculation module 30. Preferably, the feedback RAM 53 is a dual port RAM which can be written to and read from simultaneously. This ability further reduces latency in the processing operations. Thus, for the above SOP equation, the first L products of h(k)d(k) are stored in the feedback RAM 53 as intermediate values. These values are then retrieved for summation by the adder 33. The results of the summations are stored back to the feedback RAM 53 as partial presum values until D summations have been performed. At such time, the SOP's are passed to the reordering module 70.

The reordering module 70 includes a reordering RAM configuration 71 for reordering the SOP values. When a DFT operation is to be performed following the SOP processing and the decimation factor is larger than the DFT size, the reordering RAM configuration 71 can be reduced using a ping-pong architecture. Thus, while the preferred reordering RAM configuration 71 shown in FIG. 2 includes a plurality of dual port RAMS, it will be appreciated that a ping-pong RAM can also be used. Noting that a DFT can be processed in a number of clock cycles equal to the DFT size (given by L in the above equation), and that the number of clock cycles available to process one DFT is equal to the decimation factor d, when d×L the presummed values for a particular processing arm can be stored in one of two ping-pong RAMS of size L×n bits. It can be seen that the reordering module 70 further includes an input switching mechanism shown as input multiplexer 72 for retrieving the SOP values from the feedback module 50. A storage switching mechanism shown as storage demultiplexer 73 reorders the SOP values in the random access memory configuration 71 while a reordering register 74 routes the SOP values from the input multiplexer to the storage demultiplexer. A retrieval switching mechanism shown as retrieval multiplexer 75 retrieves the reordered SOP values from the reordering RAM configuration 71.

Figure 3:
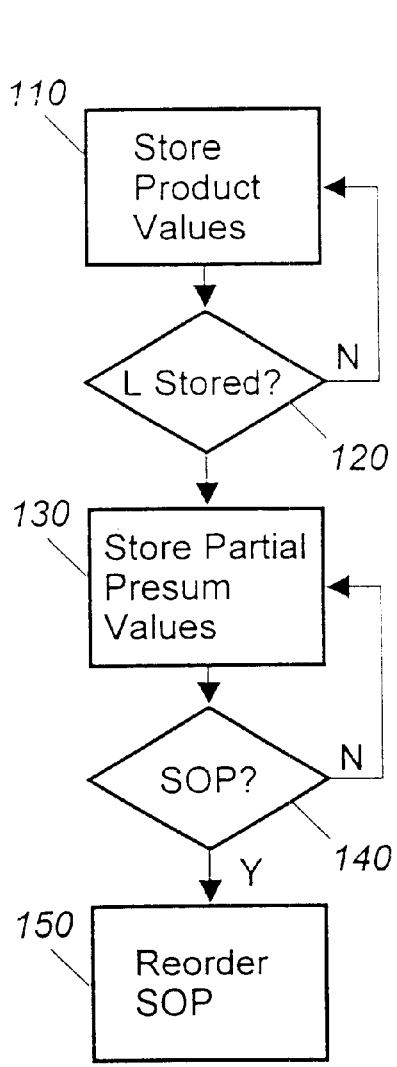
FIG. 3 is a flowchart of a computerized method for generating SOP values according to the present invention.

Turning now to FIG. 3, a computerized method for generating SOP values is shown for programming purposes. At step 110, product values are stored in the feedback RAM as intermediate values. Step 120 demonstrates that this process is continued until a predetermined number of product values is stored. In the preferred embodiment, the predetermined number of product values equals L. Partial presum values are then stored in the feedback RAM as intermediate values at step 130 until the calculation module generates SOP values. This moment is reached when D summations have been made for the first set of partial presum values. Once SOP values are obtained at step 140, the SOP values are reordered at step 150.

Figure 4:
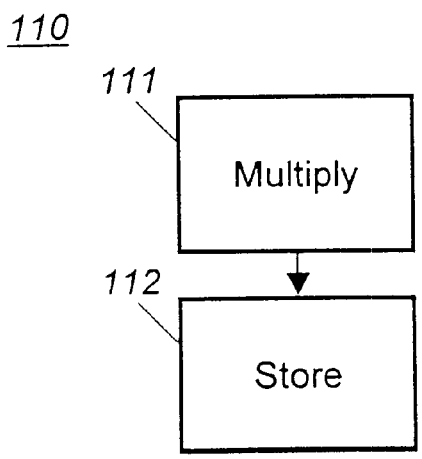
FIG. 4 is a flowchart of a subroutine for storing product values in a feedback RAM according to the present invention.

FIG. 4 demonstrates the subroutine of storing product values in greater detail. It can be seen that at step 111, the incoming data is multiplied by predetermined coefficient values. Products, of the incoming data and the predetermined coefficient values are then stored in the feedback RAM at step 112.

Figure 5:
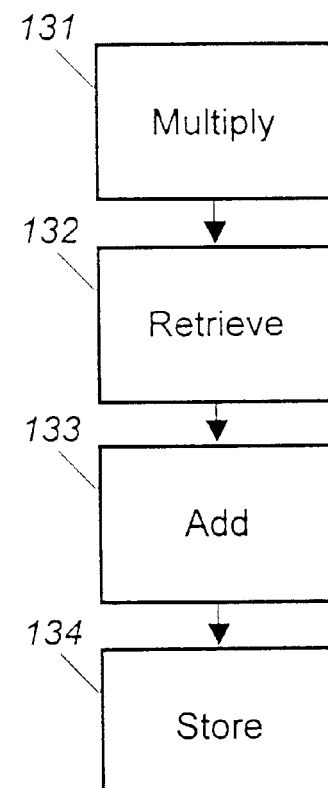
FIG. 5 is a flowchart of a subroutine for storing partial presum values in a feedback RAM according to the present invention.

Turning now to FIG. 5, the subroutine of storing partial presum values is shown in greater detail. It will be appreciated that the incoming data is multiplied by the predetermined coefficient values at step 131. At step 132 the intermediate values contained in the feedback RAM are retrieved. The products of the incoming data and the coefficient values are added to the intermediate values to generate partial presum values at step 133. At step 134 the partial presum values are then stored in the feedback RAM.

Figure 6:
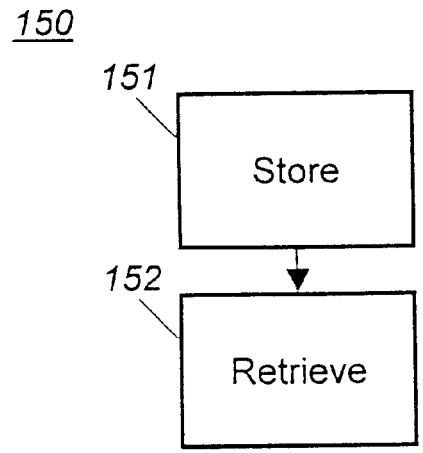
FIG. 6 is a flowchart of a subroutine for reordering SOP values according to the present invention.

FIG. 6 demonstrates the subroutine of reordering the SOP values in greater detail. Specifically, the SOP values are stored to the reordering RAM at step 151, and retrieved from the reordering RAM at step 152.

Figure 7:
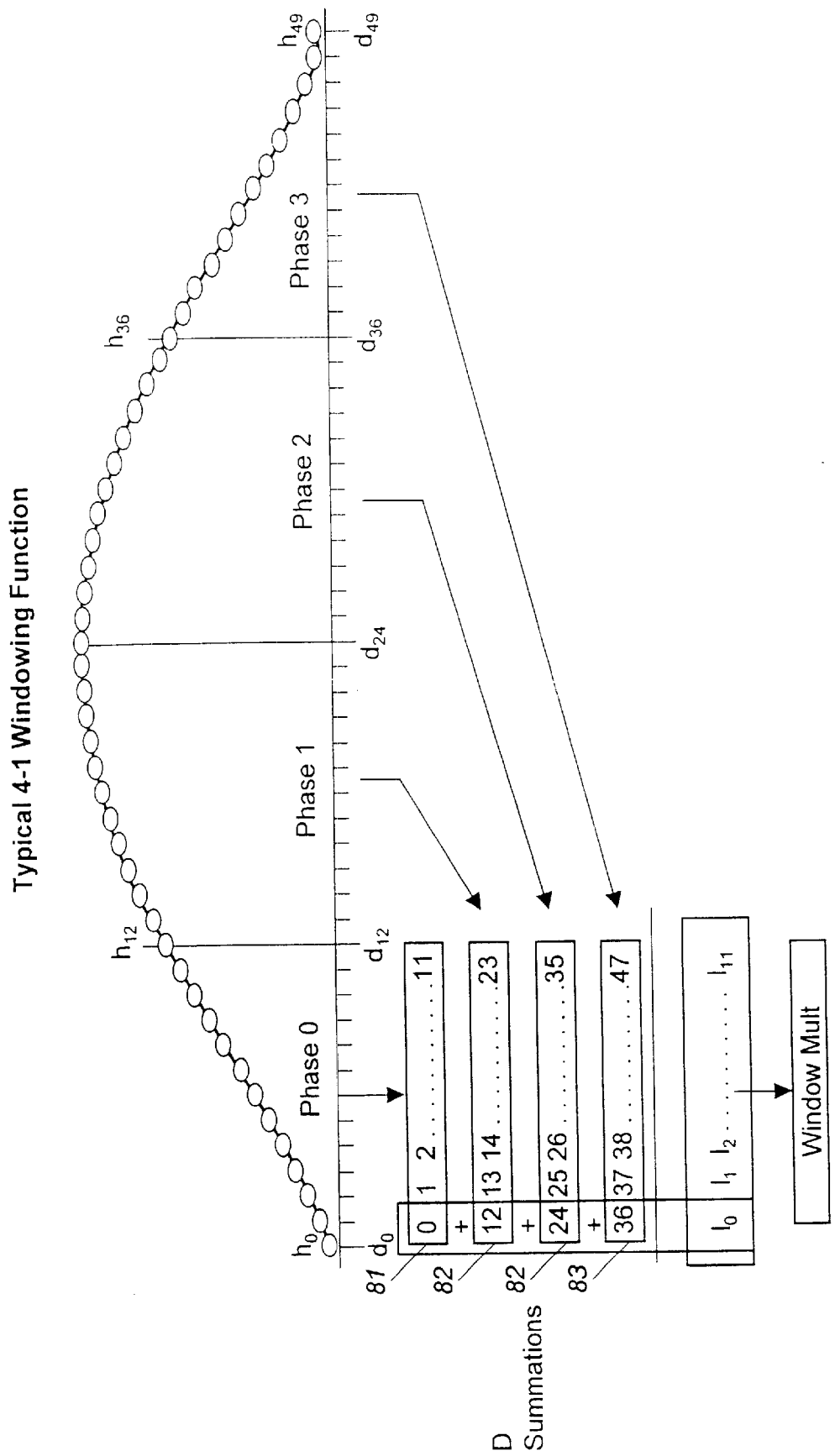
FIG. 7 is a diagram of typical windowing function computing SOPS according to the present invention.

Turning now to FIG. 7, a typical windowing function can be seen. In this example, the number of summations, D, is equal to four and the predetermined number of product values, L, is equal to twelve. Thus, product row 81 is initially stored in the feedback RAM and partial presum rows 82 are subsequently stored in the feedback RAM. SOP row 83 is then passed to the reordering module for reordering.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A processing engine for generating sum of products values for incoming data, the processing engine comprising:

a calculation module for generating intermediate values and sum of products values based on the incoming data and coefficient values, the intermediate values defined by product values and partial presum values;

a feedback module for storing the intermediate values until the calculation module generates sum of products values, comprising:

a switching mechanism for retrieving the intermediate values from the calculation module until the calculation module generates sum of products values;

a feedback random access memory for storing the intermediate values; and a holding register for retrieving the intermediate values from the feedback random access memory, the holding register routing the intermediate values to the calculation module; and a reordering module for reordering the sum of product values, the switching mechanism routing the sum of products values to the reordering module.

2. The processing engine of claim 1 wherein the feedback random access memory is a dual port random access memory.

3. The processing engine of claim 1 wherein the reordering module includes a reordering random access memory configuration for reordering the sum of products values.

4. The processing engine of claim 1 wherein the feedback module includes a plurality of feedback submodules, each feedback submodule operating on data corresponding to a processing arm of the processing engine.

5. The processing engine of claim 1 wherein the calculation module includes a plurality of calculation submodules, each calculation submodule operating on data corresponding to a processing arm of the processing engine.

6. A processing engine for generating sum of products values for incoming data, the processing engine comprising:

a calculation module for generating intermediate values and sum of products values based on the incoming data and coefficient values, the intermediate values defined by product values and partial presum values, the calculation module comprising:

a multiplier for multiplying the incoming data by the coefficient values to obtain product values;

an adder for adding the product values to the intermediate values; and a calculation register for routing the product values from the multiplier to the adder;

a feedback module for storing the intermediate values until the calculation module generates sum of products values; and a reordering module for reordering the sum of product values.

7. The processing engine of claim 6 wherein the calculation module further includes an input register for retrieving the incoming data.

8. The processing engine of claim 6 wherein the calculation module further includes a coefficient read only memory containing the coefficient values.

9. The processing engine of claim 6 wherein the reordering module includes a reordering random access memory configuration for reordering the sum of products values.

10. The processing engine of claim 6 wherein the calculation module includes a plurality of calculation submodules, each calculation submodule operating on data corresponding to a processing arm of the processing engine.

11. A processing engine for generating sum of products values for incoming data, the processing engine comprising:

a calculation module for generating intermediate values and sum of products values based on the incoming data and coefficient values, the intermediate values defined by product values and partial presum values;

a feedback module for storing the intermediate values until the calculation module generates sum of products values; and a reordering module for reordering the sum of product values, the reordering module comprising:

a reordering random access memory configuration for reordering the sum of products values;

an input switching mechanism for retrieving the sum of products values from the feedback module;

a storage switching mechanism for reordering the sum of products values in the random access memory configuration;

a reordering register for routing the sum of products values from the input switching mechanism to the storage switching mechanism; and a retrieval switching mechanism for retrieving the reordered sum of products values.

12. The processing engine of claim 11 wherein the reordering module includes a reordering random access memory configuration for reordering the sum of products values.

13. A feedback module for a sum of products processing engine, the feedback module comprising:

a calculation module for generating sum of product values and intermediate values;

a switching mechanism responsive to the intermediate values from the calculation module until the calculation module generates the sum of products values;

a feedback random access memory for storing the intermediate values; and a holding register for retrieving the intermediate values from the feedback random access memory, the holding register routing the intermediate values to the calculation module.

14. The feedback module of claim 13 wherein the feedback random access memory is a dual port random access memory.

15. A computerized method for generating sum of products values for incoming data, the method comprising the steps of:

multiplying the incoming data by predetermined coefficient values;

storing product values in a feedback random access memory as intermediate values until a predetermined number of product values is stored; retrieving the intermediate values from the feedback random access memory; adding products of the incoming data and the coefficient values to the intermediate values to generate partial presum values; storing the partial presum values in the feedback random access memory as intermediate values until a calculation module generates sum of products values; and reordering the sum of products values.

16. The method of claim 15 wherein the step of reordering the sum of products values includes:

storing the sum of products values to a reordering random access memory configuration; and retrieving the sum of products values from the reordering random access memory configuration in a desired order.

17. The method of claim 16 wherein the step of reordering the sum of products values includes reordering the sum of products values in a plurality of dual port random access memories.

18. The method of claim 16 wherein the step of reordering the sum of products values includes reordering the sum of products values in a ping pong random access memory.

19. The method of claim 15 further comprising the step of retrieving the incoming data with an input register.

20. The method of claim 15 further comprising the step of storing the coefficient values to a coefficient read only memory.

* * * * *